United States Patent
Antonius

[15] 3,662,982
[45] May 16, 1972

[54] COLLAPSIBLE SUPPORT FOR SERVING TRAYS

[72] Inventor: John I. Antonius, 3848 S.W. 36th Place, Portland, Oreg. 97221

[22] Filed: Oct. 14, 1970

[21] Appl. No.: 80,625

[52] U.S. Cl. ..............................248/309, 108/45, 211/88, 224/42.45 R
[51] Int. Cl. ......................................................A47b 37/00
[58] Field of Search ....................248/309, 311, 215; 211/88; 108/44, 45, 46; 224/42.45 R, 42.45 B

[56] References Cited

UNITED STATES PATENTS

| | | | |
|---|---|---|---|
| 1,988,598 | 1/1935 | Kleemeyer | 248/311 |
| 2,510,646 | 6/1950 | Meers | 248/311 X |
| 2,584,646 | 2/1952 | Wagstaff | 108/45 X |
| 2,689,909 | 9/1954 | Dagley | 248/315 X |
| 2,771,332 | 11/1956 | McGinley | 108/46 |

FOREIGN PATENTS OR APPLICATIONS 196,720 5/1958 Austria..............................224/42.45 R Primary Examiner—J. Franklin Foss

[57] ABSTRACT

The invention utilizes a duality of similar attaching elements, curved, terminally hooked support arm slidably bolted to a smaller 'c' shaped arcuately curved tray clamp. The tray clap has a flat segment to support a serving tray, a curved segment slidably bolted to the support arm, and vertically arcuately rotable around said bolt, and a hooked end which clamps onto the marginal rim of a tray. The support arms are 'c' shaped with a hook at one end, and their elastic structure allows the unit to clamp on an instrument panel of a car or to suspend by means of the terminal hook, the opposite end of the arm resting against a remote area of said instrument panel or such other object as said arm is attached to.

1 Claim, 4 Drawing Figures

Patented May 16, 1972 3,662,982

INVENTOR.
JOHN I. ANTONIUS

COLLAPSIBLE SUPPORT FOR SERVING TRAYS

My invention relates to serving trays and their manner of support and in particular pertains to a means of attaching a tray to the instrument panel or door of an automobile, or to the back support of the seat of an automobile or of a piece of furniture.

An object of my invention therefore is to provide a mechanism for holding a tray, said mechanism being designed to attach to the instrument panel, seat, door or other part of an automobile or other similar object.

Another object of my invention is to provide a mechanism which is so designed that it is extremely versatile and may be attached to a great variety of objects such as an open desk drawer, the back of a chair or similar object of furniture, the back of the front seat of an automobile, a door of any suitable height and in fact any object having an edge and a substantially plane surface.

Another object is to have the means of attachment simple and fast such that even persons without mechanical knack will use the device.

Other objects are to provide a device fulfilling the above aims which is inexpensive to manufacture, aesthetic in appearance, simple to use and convenient to store when not in use.

Tray supports embodying these objects must combine certain essential requirements to be of commercial value, as for example, the tray support must be instantly attachable to the target object; must have a special design whose specifications and dimensions allow for variable attachment; must provide a means for levelling the tray when attached to objects whose incline varies between the horizontal and vertical plane; must allow for simple insertion of the tray and simple removal for convenient storage; must provide height adjustment means.

When the invention is in use it may be used to support a serving tray upon which may be placed various items of food, road maps, letters, cameras and like objects. It may also be used as a means of table support where the table may be used as a writing board or the like.

With the above and related objects in view, my invention consists of the details of construction and combination of parts as described in the following paragraphs, and illustrated in the accompanying diagrams wherein:

Referring now to the diagrams, wherein similar reference characters designate similar parts, FIG. 1 shows a tray mounted on the instrument panel of an automobile the tray being generally designated as A.

Figure 1:
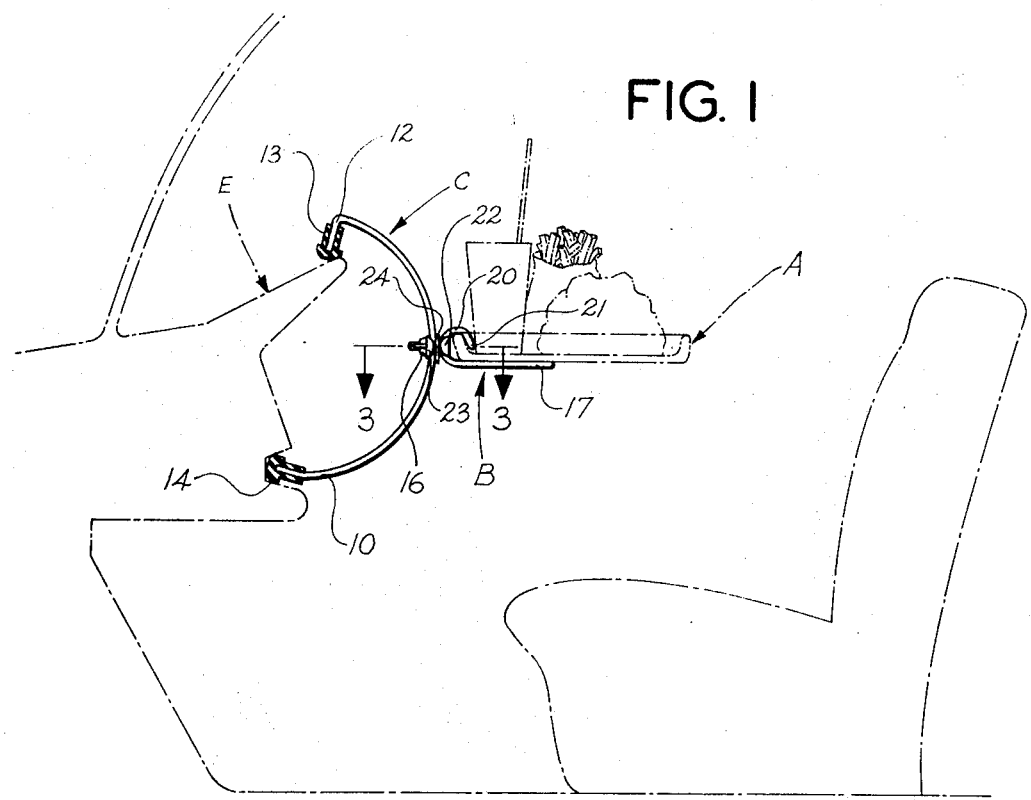
FIG. 1 is a fragmentary sectional elevation view showing the support means attached to the instrument panel of an automobile.
Figure 3:
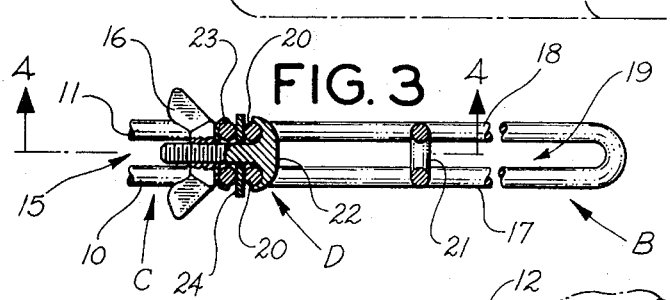
FIG. 3 is a blow-up in the horizontal plane showing sectional details along the line 3—3 in FIG. 1.
Figure 4:
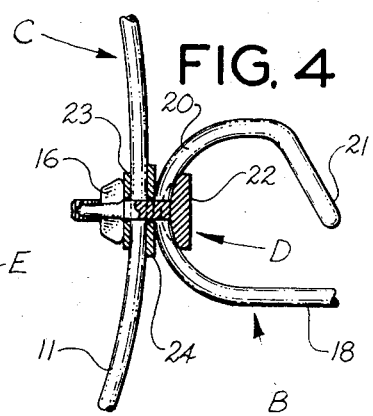
FIG. 4 is a vertical sectional view along the line 4—4 in FIG. 3.
Figure 2:
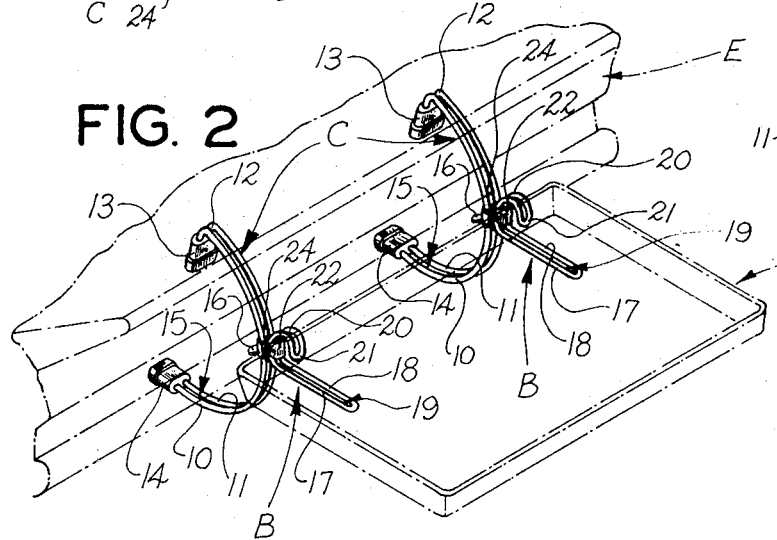
FIG. 2 is a perspective view of the support means, portions of an instrument panel and serving tray being shown in broken lines.

The tray A is supported by a pair of unitary tray clamps, said clamps generally designated B. Each clamp B is mounted on a single support arm by means of a single bolt, said support arm being generally designated C and said bolt being designated D. The support arms C, provided in duplicate, are of unitary construction and may be made from any resilient material such as plastic or spring metal the preferred embodiment shown utilizing heavy wire. Each supporting arm substantially comprises an elongate closed wire loop, said loop formed by two longitudinally aligned and parallel wires designated 10 and 11 respectively, said wires being continuous one with the other at their respective ends. The support arms C are vertically arcuate or generally C shaped one end being bent at an abrupt angle forming a hook 12, said hook being provided with a rubber or plastic cap 13. The hook 12 is designed to pivotally rest or alternatively to hook on the target object and provides the major point of suspension when the tray support is in use. A similar rubber or plastic tip 14 covers the end remote from the hook, said tips providing friction against the target and preventing scratching of finished surfaces. The members 10 and 11 enclose a narrow channel 15, said channel being designed to slidably retain the bolt D. Similarly the support arm may be of strip or tubular construction the essential embodiment being a central channel 15 and a general C or vertically arcuate shape with a hook 12 at one end. The tray clamp B may be releasably locked at any desired point relative to the length of the support arm by arcuately sliding the bolt D in channel 15 to the desired location, and the tightening the wing nut 16 on said bolt D.

The tray clamp B, provided in duplicate, is similar in construction to the support arms. Each tray clamp is of unitary construction featuring two parallel aligned wire members generally designated 17 and 18, said members being continuous at their end and providing a central channel 19, said channel designed to slidably receive the bolt D. The tray clamps are provided with a flat segment and a arcuately curved segment, said curved segment generally designated 20. The clamp ends in a slight hook 21, said hook 21 being designed to cooperate with the marginal rim of a serving tray providing a means of anchoring the tray when the support is in use.

The flat head of the threaded bolt D is oppositely crimped providing paired vertical flanges 22 laterally encompassing the vertical arcuate members 20 of the tray clamp B providing for vertical arcuate sliding of said bolt in the channel 19 while preventing rotation of the bolt head around the axis of the bolt. The bolt D is provided with a wing nut 16 and a washer 23, said washer being laterally flanged, said flanges encompassing support members 10 and 11. A flat washer 24 prevents overriding of the support arms and the tray clamp members.

To use my invention, the hooks B are slidably attached to the support arms C by the bolt D. Two or more such units may be used to support a table or tray although two are preferred. Each unit in turn is hooked onto the instrument panel of a car or the upright portion of the rear seat, the back of a chair or the like in substantially the same manner. The hooked end 12 is thrust onto the top of an instrument panel for example, where it will pivotally suspend. The weight of the support arm causes it to rotate arcuately around the hook end whereon the remote end either thrusts against a similarly remote area of the target or clamps onto a remote side of the target as the case may suit. The clamp is moved into a desired location on the support arm and rotated in such a way that the straight segment is in a horizontal position. It is locked into this position by tightening the wing nut 16 on the bolt D. The second unit is similarly adjusted and the serving tray is inserted into the hook B where it is held in a horizontal position by the hook 21. The tray is ready for use. Once the position of the hooks has been set they need not be adjusted for subsequent use. Each member of the support is merely hung in the desired location and the tray pushed into place. Lateral movement of the support arms is prevented by friction of the hooks against the tray.

It has been found that the device described herein may be attached instantly to counter tops, desk tops, car doors, the back or side arm of chairs and chesterfields, to open desk drawers and to the front seat of an automobile for persons sitting in the rear seat. Weight placed upon the tray increases the stability of the unit. To store, the tray is withdrawn and the two support members are unhooked from their site of attachment and may be lain upon the tray requiring very little space for storage.

Since the foregoing description is illustrative rather than limiting, the scope of my invention is to be determined as claimed.

I claim as my invention:

1. Collapsible means for supporting a serving tray wherein vertically arcuate and generally C-shaped support arms are releasably bolted to tray clamps, said support arms being provided with a terminal hook pivotally thrustable against the support structure and elevated relative to the point of attachment of the tray clamp, said support arms comprising paired parallel members encompassing a lengthwise channel designed to slidably receive said bolt, rubber or plastic caps on said hook, rubber caps on the end of the support arms remote from said hooks said remote end being designed to thrust against or clamp onto a part of the support structure remote from said hooked end, a tray hook releasably and rotatably bolted to a support means, said tray hook generally C-shaped and vertically arcuate providing an open loop designed to instantly receive the marginal rim of a serving tray, a hooked end of said loop said hook designed to thrustably hold the marginal rim of a serving tray, a straight segment of the hook for bottom support of a tray, said hook elevated relative to said straight segment, said vertically arcuate segment slidably retaining the flanged head of a bolt providing vertical arcuate sliding of the tray clamp relative to said bolt head and independent rotation of the tray clamp around the axis of said bolt, means for releasably locking the tray clamp in a predetermined position, lateral members enclosing a central channel slidably retaining said bolt.

* * * * *